United States Patent
Gomez et al.

(10) Patent No.: US 10,297,938 B2
(45) Date of Patent: May 21, 2019

(54) CARD EDGE CONNECTOR COUPLINGS

(71) Applicant: Hewlett-Packard Development Company, L.P., Houston, TX (US)

(72) Inventors: Adolfo A. Gomez, Fort Collins, CO (US); Jonathan D. Bassett, Fort Collins, CO (US); Byron A. Alcorn, Loveland, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/567,607

(22) PCT Filed: Jun. 10, 2015

(86) PCT No.: PCT/US2015/035085
§ 371 (c)(1),
(2) Date: Oct. 18, 2017

(87) PCT Pub. No.: WO2016/200380
PCT Pub. Date: Dec. 15, 2016

(65) Prior Publication Data
US 2018/0138613 A1    May 17, 2018

(51) Int. Cl.
| | |
|---|---|
| H01R 12/72 | (2011.01) |
| G06F 1/26 | (2006.01) |
| G06F 13/40 | (2006.01) |
| G06F 13/42 | (2006.01) |
| H01R 12/70 | (2011.01) |
| H01R 12/79 | (2011.01) |

(52) U.S. Cl.
CPC ............ *H01R 12/721* (2013.01); *G06F 1/26* (2013.01); *G06F 13/4068* (2013.01); *G06F 13/4282* (2013.01); *H01R 12/7076* (2013.01); *H01R 12/79* (2013.01); *H01R 12/7082* (2013.01)

(58) Field of Classification Search
CPC .............. H01R 12/721; H01R 13/6658; H01R 13/6275
See application file for complete search history.

(56) References Cited

U.S. PATENT DOCUMENTS

| | | | |
|---|---|---|---|
| 6,814,588 B1 | 11/2004 | Dunlavy | |
| 7,175,444 B2 * | 2/2007 | Lang | H01R 43/00 439/76.1 |
| 8,905,777 B2 * | 12/2014 | Zhu | H01R 13/62 439/352 |
| 9,071,003 B2 * | 6/2015 | Lindkamp | H01R 13/50 |

(Continued)

FOREIGN PATENT DOCUMENTS

| | | |
|---|---|---|
| CN | 202997194 | 6/2013 |
| JP | 2012022945 | 2/2012 |

(Continued)

OTHER PUBLICATIONS

M.2 (NGFF) Connector, Apr. 23, 2014, pp. 1-21, Singatron Enterprise Co., Ltd.

*Primary Examiner* — Ross N Gushi
(74) *Attorney, Agent, or Firm* — Brooks, Cameron & Huebsch PLLC

(57) ABSTRACT

In one implementation, an apparatus for card edge connector couplings includes a card edge connector coupled to a card edge, and a number of conductors coupling the card edge to a device connector.

15 Claims, 5 Drawing Sheets

(56) References Cited

U.S. PATENT DOCUMENTS

| | | | |
|---|---|---|---|
| 2010/0291794 A1* | 11/2010 | Luo .................... | H01R 31/005 439/502 |
| 2011/0195593 A1* | 8/2011 | McGrath .............. | H01R 12/594 439/345 |
| 2013/0004120 A1 | 1/2013 | Zbinden et al. | |
| 2013/0084754 A1 | 4/2013 | Mason et al. | |
| 2013/0231008 A1 | 9/2013 | Gao et al. | |

FOREIGN PATENT DOCUMENTS

| JP | 2014011008 | 1/2014 |
|---|---|---|
| TW | M467223 | 12/2013 |
| TW | M479541 | 6/2014 |

* cited by examiner

CARD EDGE CONNECTOR COUPLINGS

BACKGROUND

Expansion cards can be utilized with a computing device to provide additional functionality and/or additional memory resources for additional functionality. Expansion cards can have integrated circuits such as a printed circuit board and/or a printed circuit assembly. Some expansion cards can include a number of sockets that can be utilized to couple a device to the expansion cards. For example, a socket coupled to an expansion card can be utilized to couple a particular type of memory resource to the expansion card.

DETAILED DESCRIPTION

Figure 1:
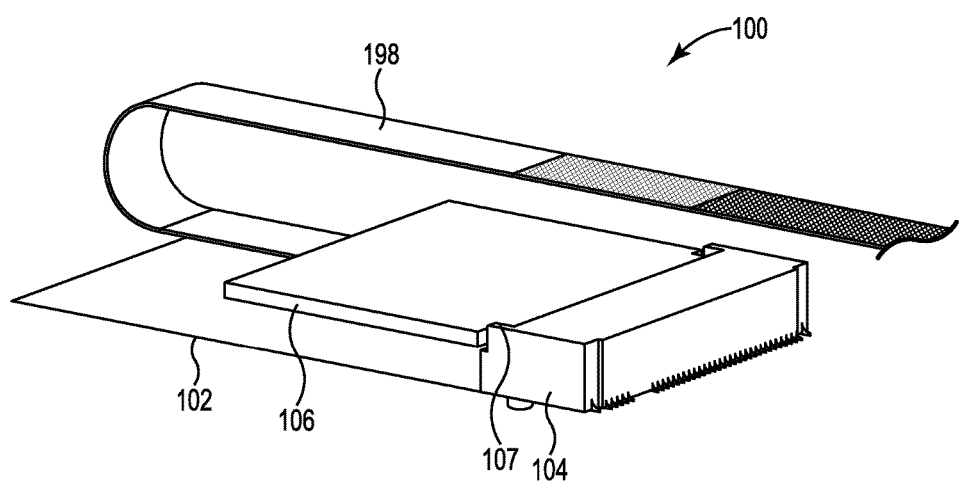
FIG. 1 illustrates a diagram of an example of a system for a card edge connector coupling consistent with the present disclosure.

A number of methods, systems, and apparatuses for card edge connector couplings are described herein. In one example, an apparatus for a card edge connector coupling can comprise a card edge connector coupled to a card edge and a number of conductors coupling the card edge to a device connector. In another example, a system for a card edge connector coupling can comprise a host side coupled to a card edge connector, the card edge connector coupled to a card edge comprising a number of conductors between an inner-mold and an over-mold, and a device connector coupled to the number of conductors.

The card edge connector coupling as described herein can provide a connection between a host side and a device. In some examples, the connection that can be provided can be a communication link between the host side and the device. For example, a number of protocols can be utilized to communicate a number of signals between the host side and the device. In some examples, the host side can be a computing card (e.g., expansion card, motherboard, printed circuit board (PCB), printed circuit assembly (PCA), M.2 expansion card, etc.). As used herein, an M.2 expansion card can include an optional card that allows a system to be expanded to support M.2 modules. In some examples, the device can include a number of devices that can be utilized to store data and/or provide functionality. For example, the device can include a memory resource (e.g., non-transitory computer readable medium, solid state drive, SATA drive, etc.).

In some examples, the card edge connector coupling as described herein can provide greater signal performance compared to systems that utilize a header device. For example, the card edge connector coupling as described herein can provide rates of data exchange greater than approximately 6 gigabytes per second (GB/s) while maintaining the signal integrity. In some examples, the card edge connector as described herein can be compliant with a variety of host and/or device side definitions. For example, the card edge connector coupling can comply with electro-mechanical definitions of an M.2 expansion card. That is, in this example, the clearance, the pin configuration, and power configuration are adapted to the M.2 expansion card.

The card edge connector coupling as described herein can provide greater signal performance of the connection between the host side and the device. In addition, the card edge connector coupling as described herein can support a plurality of device-side connectors (e.g., device connectors, OCuLink connectors, SFF-8939 connectors, universal serial bus (USB), etc.). In some examples, the card edge connector coupling as described herein can support a plurality of different communication protocols. In addition, the card edge connector coupling as described herein can include a card edge that is a headerless connection between the card edge connector and the number of connectors. Thus, the card edge connector coupling as described herein can provide a high performance connection between a host side and a plurality of different devices by providing a multipurpose device side connection.

FIG. 1 illustrates a diagram of an example of a system 100 for a card edge connector coupling consistent with the present disclosure. The system 100 can include a host side 102. The host side 102 can be a computing card (e.g., printed circuit board, printed circuit assembly, expansion card, motherboard, etc.). For example, the host side 102 can be an expansion card that is installed in a card slot of a computing device to perform a particular function. In another example, the host side 102 can include an M.2 expansion card.

In some examples, the system 100 can include a card edge connector 104. The card edge connector 104 can be utilized to couple a card edge to the host side 102. In some examples, the card edge connector 104 can include a socket that is coupled to the host side 102. For example, the card edge connector 104 can be an M.2 socket that can be utilized to couple an M.2 device (e.g., memory device, etc.) to the host side 102. In some examples, the card edge connector 104 can accept a single type of device that corresponds to the configuration of the card edge connector 104.

In some examples, the system can include a card edge 106. The card edge 106 can be coupled to the card edge connector 104. In some examples, the card edge 106 can be permanently coupled to the card edge connector 104. For example, the card edge 106 can be soldered to a number of corresponding connections of the card edge connector 104. Permanently coupling the card edge 106 to the card edge connector can provide a better connection between the card edge 106 can the card edge connector 104 compared to non-permanent or semi-permanent connectors. For example, a header can be considered a non-permanent or semi-permanent connector that can be utilized with a card edge connector 104. In this example, the header can include a number of additional disconnects that can lower a connection speed between the card edge 106 and the card edge connector 104.

The connection between the card edge 106 and the card edge connector 104 can enable the system 100 to provide greater signal performance between the host side 102 and a device coupled to the card edge 106 and/or card edge connector 104. In addition, the connection between the card edge 106 and the card edge connector 104 can enable a plurality of different protocols to be utilized when communicating with a particular device coupled to the number of conductors 108.

In some examples, a number of regulators 107 can be coupled to the card edge connector 104 and/or the card edge 106. For example, the number of regulators 107 can be soldered to the card edge connector 104 and/or the card edge 106. The number of regulators 107 can include a number of power regulators that regulate the output of power from the host side 102 to the device coupled to the host side 102.

In some examples, the card edge 106 can be coupled to a number of conductors 108. The number of conductors 108 can include a number of wires that can be utilized to transfer communication and/or power from the host side 102 to a device coupled to the number of conductors 108. In some examples, the number of conductors 108 can be located at a position over the host side 102, card edge connector 104, and/or the card edge 106. In some examples, the number of conductors 108 can be coupled to the card edge 106 to translate functionality from the host side 102 (e.g., M.2 expansion card) to a device connector coupled to a device. In some examples, a number of regulators, transceivers, and/or logic can be utilized to translate the functionality from the host side 102 to the device connector coupled to a device.

Figure 2:
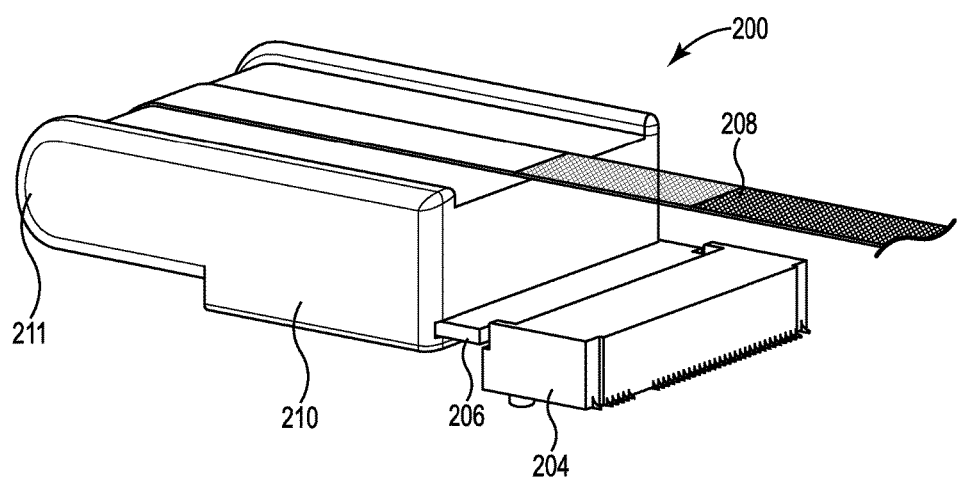
FIG. 2 illustrates a diagram of an example of a system for a card edge connector coupling consistent with the present disclosure.

FIG. 2 illustrates a diagram of an example of a system 200 for a card edge connector coupling consistent with the present disclosure. The system 200 can include the same and/or similar elements as system 100 referenced in FIG. 1. For example, the system 200 can include a card edge 206. As described herein, the card edge 206 can be semi-permanently or permanently coupled to a card edge connector (e.g., socket, etc.). For example, the card edge 206 can be coupled to each of a plurality of connections (e.g., pins, etc.) of the card edge connector. In some examples, the card edge 206 can be a headerless connection between the card edge connector and the number of conductors.

In some examples, the system 200 can include an inner-mold 210. The inner-mold 210 can be utilized to separate a number of conductors 208 (e.g., wires, etc.) from a top portion of the card edge 206. In some examples, the inner-mold 210 can be coupled to a top portion of the card edge 206. That is, the inner-mold 210 can be positioned between a top portion of the card edge 206 and the number of conductors 208 passing over the top portion of the card edge 206. In some examples, the inner-mold 210 can include a "rounded" edge 211. That is, the number of conductors 208 can be coupled to the inner-mold 210 that separates the number of conductors 208 from the card edge 206.

The rounded edge 211 can be utilized to change a direction of the number of conductors 208 from a first direction (e.g., left of FIG. 2, etc.) to a second direction (e.g., right of FIG. 2, etc.). The rounded edge 211 can prevent the number of conductors 208 from "kinking" or being damaged when the direction of the number of conductors 208 is changed from the first direction to the second direction. In some examples, the inner-mold 210 and rounded edge 211 can be utilized to elevate the number of conductors 208 above the card edge 206 and/or card edge connector (not shown). In these examples, the inner-mold 210 and rounded edge 211 can prevent the number of conductors 208 from interacting with the card edge 206 and/or card edge connector (not shown).

In some examples, the system 200 can include a conductor relief (e.g., strain relief, etc.). The conductor relief can be coupled to the number of conductors 208 at an exit point of the inner-mold 210 and/or over-mold. The conductor relief can prevent the number of conductors 208 from being removed from the card edge 206. In some examples, the conductor relief can prevent tension from being placed on the number of conductors 208 within the over-mold. That is, the conductor relief can be coupled to the number of conductors 108 at an exit point of the over-mold.

In some examples, the system 200 can include an over-mold. The over-mold can be utilized to protect the card edge 206, inner-mold 210, and/or number of conductors 208. The over-mold can be coupled to a host side (not shown) via a retention receiver. The retention receiver can be coupled to the host side via a hardware device (e.g., screw, pin, etc.). In some examples, the retention receiver can be positioned at a location to utilize an existing hardware device receiver (e.g., threaded receiver, etc.). The retention receiver can semi-permanently couple the over-mold to the host side. The retention receiver can aid the over-mold in protecting the number of conductors 208, the inner-mold 210, the card edge 206, and/or the edge card connector by providing a semi-permanent connection to the host side.

Figure 3:
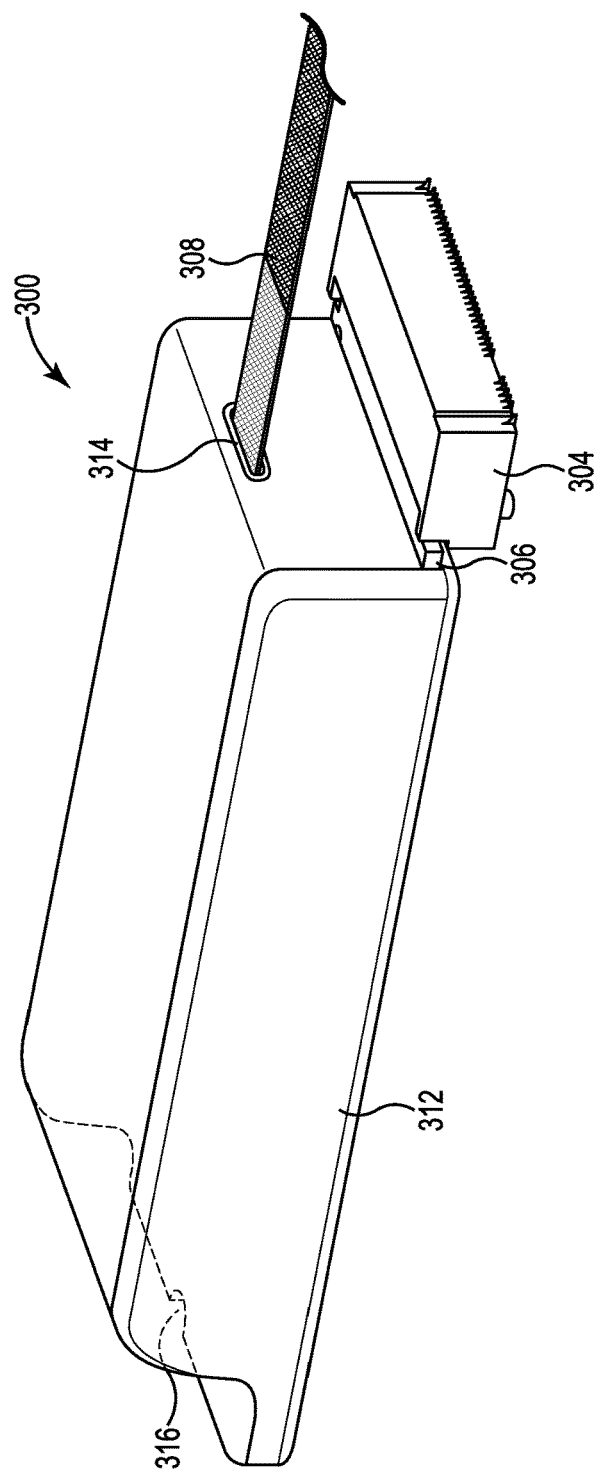
FIG. 3 illustrates a diagram of an example of a system for a card edge connector coupling consistent with the present disclosure.

FIG. 3 illustrates a diagram of an example of a system 300 for a card edge connector coupling consistent with the present disclosure. The system 300 can include the same and/or similar features as the system 200 referenced in FIG. 2 and/or the system 100 as referenced in FIG. 1. System 300 can include a card edge connector 304. As described herein, the card edge connector 304 can be coupled to a host side (not shown) and can be utilized to couple an acceptable device to the host side.

The system 300 can include a card edge 306 that is semi-permanently or permanently coupled to the card edge connector 304. As described herein, the card edge 306 can be coupled to each of a plurality of pins within the card edge connector 304. In some examples, the card edge 306 can have a number of corresponding pins that can be coupled to the card edge connector. The card edge 306 can be permanently coupled to a number of conductors 308. In some examples, the card edge 306 can be coupled to the number of conductors 308 at a position below an over-mold 312. As described herein, the number of conductors 308 can be soldered to corresponding positions of the card edge 306.

The over-mold 312 can be utilized to secure and/or protect the number of conductors 308 under the over-mold 312. In some examples, the over-mold 312 can be utilized to protect the card edge 306 and/or card edge connector 304. In some examples, the over-mold 312 can be coupled to a host side (not shown) via a retention receiver 316. The retention receiver 316 can be used in combination with a hardware device such as a screw and a hardware receiver such as a threaded receiver. The system 300 can include a conductor relief 314 that can be coupled to the number of conductors 308. The conductor relief 314 can prevent unwanted tension of the number of conductors 308 within the over-mold 312.

Figure 4:
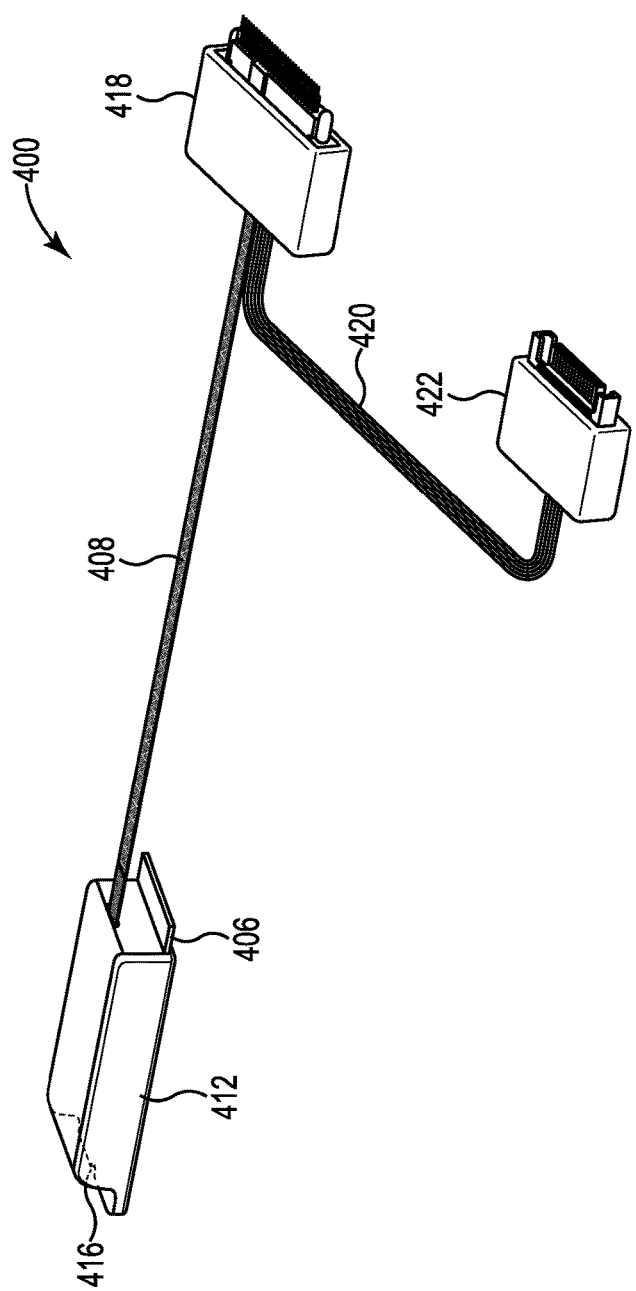
FIG. 4 illustrates a diagram of an example of a system for a card edge connector coupling consistent with the present disclosure.

FIG. 4 illustrates a diagram of an example of a system 400 for a card edge connector coupling consistent with the present disclosure. The system 400 can include the same and/or similar features as the system 300 referenced in FIG. 3, the system 200 referenced in FIG. 2 and/or the system 100 as referenced in FIG. 1. The system 400 can include a card edge 406 as described herein with an over-mold 412 and a retention receiver 416 to couple the over-mold 412 to a host side (not shown).

The system 400 can include a number of conductors 408 coupled to the over-mold 412 as described herein. The number of conductors 408 can be coupled to a device connector 418 (e.g., device side connector, connector to receive a device on the device side, OCuLink connector, Sff-8639 connector, drive backplane connector, storage device connector, etc.). In some examples, the device connector 418 can be different from the type of connector as the card edge connector (not shown). That is, the device connector 418 can have a different pin configuration and/or functionality compared to the card edge connector described herein. In some examples, the device connector 418 can be multi-purpose device connector that can be coupled to a plurality of different device types with different functionality than devices capable of being coupled directly to the card edge connector.

The system 400 can include an auxiliary power connector 422 (e.g., power supply unit (PSU) connector, SATA power connector, connector to receive electrical power, etc.). The auxiliary power connector 422 can be coupled to the device connector 418 via a number of conductors 420 to provide additional power to a device (e.g., memory device, etc.) coupled to the device connector. The number of conductors 420 can include a number of wires capable of transferring a particular quantity of power to the device connector 418 and/or device coupled to the device connector 418.

In some examples, the auxiliary power connector 422 can provide electrical power that is not supplied by the card edge connector coupled to the card edge 406. That is, the host side and/or card edge connector may not be able to provide the electrical power that is needed by the device coupled to the device connector 418. In some examples, the auxiliary power connector 422 can provide supplemental power in addition to power provided by the host side to a device that is coupled to the device connector 418. In some examples, an over-mold can cover the device connector 418 and/or the auxiliary power connector 422 to protect the conductors 408, 420 coupled to the device connector 418 and auxiliary power connector respectively.

Figure 5:
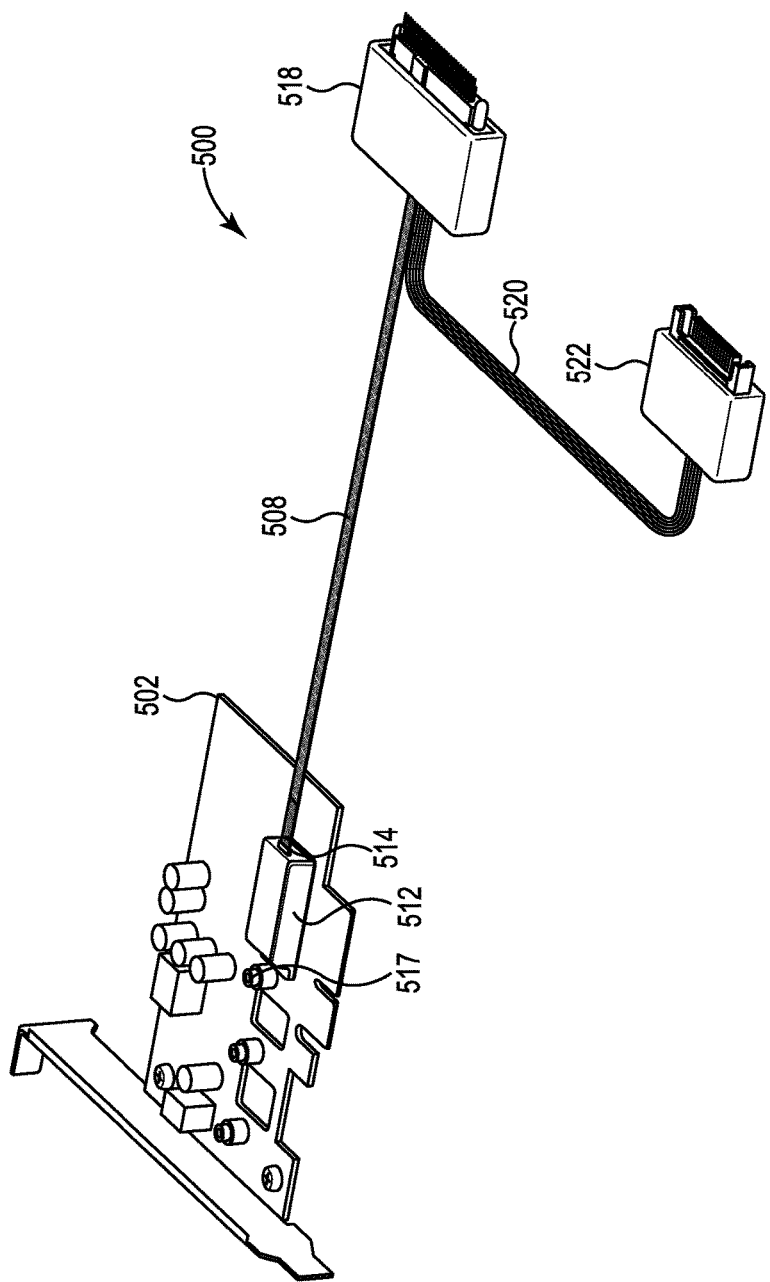
FIG. 5 illustrates a diagram of an example of a system for a card edge connector coupling consistent with the present disclosure.

FIG. 5 illustrates a diagram of an example of a system 500 for card edge connector coupling consistent with the present disclosure. The system 500 can include the same and/or similar features as the system 400 referenced in FIG. 4, the system 300 referenced in FIG. 3, the system 200 referenced in FIG. 2, and/or the system 100 as referenced in FIG. 1. The system 500 can include an example when an over-mold 512 as described herein is coupled to a host side 502 via a hardware device 517.

As described herein, the host side 502 can include a computing card such as an expansion card and/or a motherboard. The host side 502 can include a hardware receiver as described herein to receive the hardware device 517 and couple the over-mold 512 to the host side 502. The system 500 can include a number of conductors 508 as described herein to transfer communication and/or power from the host side 502 to a device connector 518. In some examples, the system 500 can include a conductor relief 514 to stabilize the number of conductors 508. As described herein, the device connector 518 can include a device side connector that can be coupled to a device such as a memory device and/or other computing device (e.g., computer, PCB, PCA, etc.).

The system 500 can include an auxiliary power connector 522 that can be coupled to a power source and send power to the device connector 518 via a number of conductors 520. In some examples, the auxiliary power connector 522 can provide supplemental power in addition to power provided by the host side 502 to a device that is coupled to the device connector 518. In some examples, the device connector 518 and/or auxiliary power connector 522 can include an over-mold to protect the number of conductors 508, 520 coupled to the device connector 518 and auxiliary power connector 522 respectfully. In some examples, the number of conductors 508, 520 can be permanently coupled (e.g., soldered) to the device connector 518 and auxiliary power connector 522 respectfully.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. An apparatus, comprising:
 a card edge connector coupled to a card edge;
 a number of conductors coupling the card edge to a device connector; and
 a mold to:
  be positioned between the number of conductors and a portion of the card edge; and
  alter a direction of the number of conductors from a first direction to a second direction.

2. The apparatus of claim 1, wherein the number of conductors are directed by a rounded edge of the mold to alter the direction of the number of conductors from the first direction to the second direction.

3. The apparatus of claim 1, wherein the card edge is a headerless connection between the card edge connector and the number of conductors, wherein a headerless connection includes a physical connection that does not utilize a pin header device.

4. The apparatus of claim 1, wherein the number of conductors are permanently coupled to the card edge and the device connector.

5. The apparatus of claim 1, comprising an over-mold covering the number of conductors and the mold.

6. The apparatus of claim 5, wherein the over-mold includes a retention receiver to couple the over mold to a host side comprising the card edge connector.

7. The apparatus of claim 5, wherein the over-mold includes a conductor relief coupled to the number of conductors.

8. A system comprising:
 a host side coupled to a card edge connector;
 the card edge connector coupled to a card edge comprising a number of conductors between an inner-mold and an over-mold, wherein the inner-mold includes a rounded edge to alter a direction of the number of conductors from a first direction to a second direction; and
 a device connector coupled to the number of conductors.

9. The system of claim 8, wherein the card edge is soldered to the number of conductors.

10. The system of claim 8, wherein the device connector is a storage device connector.

11. The system of claim 8, wherein the over-mold is coupled to the host side.

12. A system, comprising:
   an M.2 expansion card comprising an M.2 socket permanently coupled to a host side of the M.2 expansion card;
   a card edge coupled to the M.2 socket;
   a plurality of conductors permanently coupled to the card edge; and
   a device connector coupled to the plurality of conductors, wherein the device connector provides a different functionality from the M.2 socket, wherein the device connector is coupled to an auxiliary power connector.

13. The system of claim 12, wherein the plurality of conductors are coupled to the card edge to transfer control of functionality from the M.2 expansion card to the device connector.

14. The system of claim 12, wherein the M.2 expansion card allows the system to be expanded to support M.2 modules.

15. The system of claim 12, wherein the device connector is a multi-purpose device connector.

* * * * *